US006778837B2

(12) United States Patent
Bade et al.

(10) Patent No.: US 6,778,837 B2
(45) Date of Patent: Aug. 17, 2004

(54) SYSTEM AND METHOD FOR PROVIDING ACCESS TO MOBILE DEVICES BASED ON POSITIONAL DATA

(75) Inventors: Steven A. Bade, Georgetown, TX (US); Robert H. LeGrand, III, Austin, TX (US); Mark-David J. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 09/815,542

(22) Filed: Mar. 22, 2001

(65) Prior Publication Data

US 2002/0137524 A1 Sep. 26, 2002

(51) Int. Cl.[7] .................................................. H04Q 7/20
(52) U.S. Cl. ..................... 455/456.1; 342/457; 375/200; 380/258
(58) Field of Search .............................. 455/456, 456.1; 375/200; 342/457; 380/258; 370/349, 338, 346

(56) References Cited

U.S. PATENT DOCUMENTS

| 5,842,112 A | * | 11/1998 | Fuller et al. |
| 6,009,116 A | * | 12/1999 | Bednarek et al. ............ 375/200 |
| 6,236,365 B1 | * | 5/2001 | LeBlanc et al. ............. 342/457 |
| 2002/0051540 A1 | * | 5/2002 | Glick et al. .................. 380/258 |

* cited by examiner

*Primary Examiner*—William Cumming
(74) *Attorney, Agent, or Firm*—Diana L. Roberts; Edmond A. DeFrank

(57) ABSTRACT

The present invention includes as one embodiment a method for automatically controlling access to a mobile computing device with pertinent data. The method includes predefining access parameters of the mobile computing device, determining an actual location of the mobile computing device and using the actual location of the mobile computing device to automatically control access to the mobile computing device based on the predefined access parameters. Also, the method includes storing the predefined access parameters in a private Internet networked location, accessing and updating the predefined access parameters and sending the updated access parameters to the mobile computing device.

20 Claims, 3 Drawing Sheets

SYSTEM AND METHOD FOR PROVIDING ACCESS TO MOBILE DEVICES BASED ON POSITIONAL DATA

BACKGROUND OF THE INVENTION

1. Field of the Invention

The present invention relates in general to mobile electronic devices and in particular to a system and method for providing access to mobile devices based on positional data, such as controlling and authenticating access rights to the mobile devices.

2. Related Art

Electronic mobile devices are becoming more and more ubiquitous because they help users manage their busy schedules, as well as communicate with the world. For example, portable computers, such as notebook or laptop computers, personal data assistants (PDAs) and mobile telephones are becoming necessities for many. Notebook or laptop computers are very popular because they are extremely lightweight personal computers that can easily fit in a briefcase for the mobile businessperson. Aside from size, the principal difference between a notebook or laptop computer and a personal computer is the display screen. Portable computers typically use flat-panel technologies, which are lightweight and non-bulky.

A PDA is a handheld mobile device that allows users to access information, keep track of their busy schedules, and communicate with others. A typical PDA can function as a mobile or cellular phone, fax sender, and personal organizer. Recently, many of the major announcements revolve around wireless connectivity for a PDA. It is very important for today's mobile professional to be able to access information from anywhere in the world. Similar to the portable computer, PDAs are very popular because they are designed to be portable and small. Currently, PDA manufactures strive to make PDAs as portable and small as possible. Fitting easily into a wallet, small purse, or shirt pocket, the newest PDAs can travel anywhere in the world. Therefore, people do not think twice about taking their portable computer, PDA or mobile telephone anywhere.

Further, real-time positional systems access coordinate position data from various sources, such as local transmitters or satellites, and are becoming more and more popular. These systems include GPS (Global Position Satellites), MLS (Microwave Landing Systems), GSM (Global System Mobile), GIS (Geographical Information Systems) and CPS (Cambridge Positioning Systems) and have been recently incorporated into personal computers, electronic mobile devices and automobiles. However, limited uses are available for these positioning technologies. For instance, these systems are used to primarily support mobile mapping applications for recreational uses, such as driving directions, camping and hiking.

As such, there are limited applications available that combine both the portability of these mobile devices with the capabilities of real-time positioning systems. Namely, current systems lack the power to provide a user with secure protection to the user's mobile device based on the location of the device. In one example, access to the user's mobile device is the same in all areas, even if the user knows that he primarily uses his mobile device within a certain area, such as his office or travels only to certain areas or cities.

Therefore, what is needed is a system and method for providing access to mobile devices based on positional data. What is further needed is a system and method that that automatically and dynamically locates position, matches data to position and automatically relays modified data to the electronic device for authenticating and controlling access rights to mobile devices. What is also needed is a system and method that automatically prevents unauthorized access to the mobile device based on locations where access is not likely to occur in case of theft or misplacement of the mobile device.

SUMMARY OF THE INVENTION

To overcome the limitations in the prior art described above, and to overcome other limitations that will become apparent upon reading and understanding the present specification, the present invention is embodied in a system and method for providing access to mobile devices based on positional data. Namely, an authentication system of the present invention controls and authenticates access rights to the mobile devices.

In general, the present invention includes a mobile electronic device and a wireless positioning system, such as a global positioning satellite (GPS). The electronic mobile device can be any suitable portable electronic device, such as a wireless telephone, personal data assistant, portable notebook computer or the like. The electronic mobile device includes a positioning receiver and an authentication module. First, predefined access parameters are defined. These predefined access parameters associate specific locations with access rights.

Next, during start-up or login of the mobile electronic device, the authentication module initiates and the positioning receiver of the mobile electronic device receives information relative to its position from the wireless positional system. The authentication module then determines whether access should be granted or denied, or requires a special password for access based on the predefined access parameters. This can be accomplished since the mobile electronic device is automatically and dynamically tracked by the positioning receiver.

Also, the software running on the mobile device can be preprogrammed with parameters that define what locations require a password or create restricted access. Therefore, when the electronic device moves from position to position, access to the mobile device can be automatically and dynamically provided or denied, depending on the predefined parameters and the location of the mobile device at the time access is requested. This can automatically prevent unauthorized access of the mobile device based on locations where access is not likely to occur in case of theft or misplacement of the mobile device.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. General Overview of the Components

Figure 1:
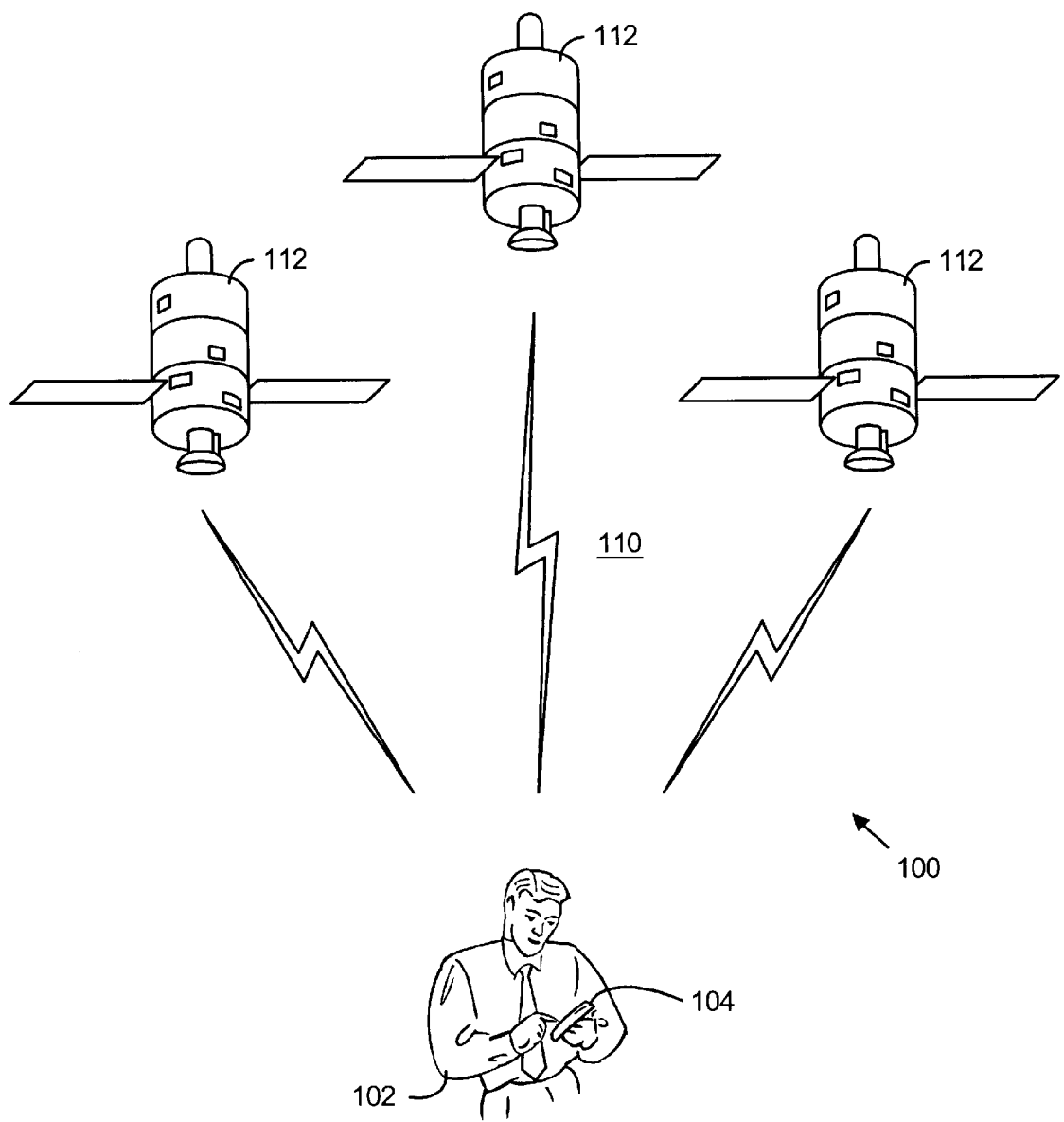
FIG. 1 is a general block diagram showing an overview of the present invention.

FIG. 1 is a general block diagram showing an overview of the present invention. The system 100 includes a user 102 that uses a mobile electronic device 104 that has modules operating on the electronic device 104, and a positioning system 110 that includes at least one transmitter 112, such as a positioning satellite. The positioning system 110 can be any suitable positional access system, such as satellite, microwave, infrared, or radio based, which provides positional access with any suitable method, for example triangulation. The number of transmitters 112 in the transmitter system 110 can be determined based on the number required to obtain a clear view for triangulation. The mobile device 104 has a special a receiver that is capable of receiving a signal from the positioning system 110.

Most types of positional access systems pinpoint location through triangulation. With triangulation, a receiver gathers information from several transmission sources. One type of triangulation is three dimensional (3D) triangulation, which provides latitudinal, longitudinal and elevational coordinates to the receiver. As such, 3D triangulation requires plural transmitters and a predefined coordinate system. For instance, GPS systems typically use 12 satellite transmitters. In the GPS system, a clear view is usually required to allow a receiver to receive a signal from four or more transmitters so that the coordinates of the receiver can be located. Once the coordinates are determined, the specific location can be shown as coordinates or illustrated on an associated electronic map that relates to the actual coordinates.

Figure 2:
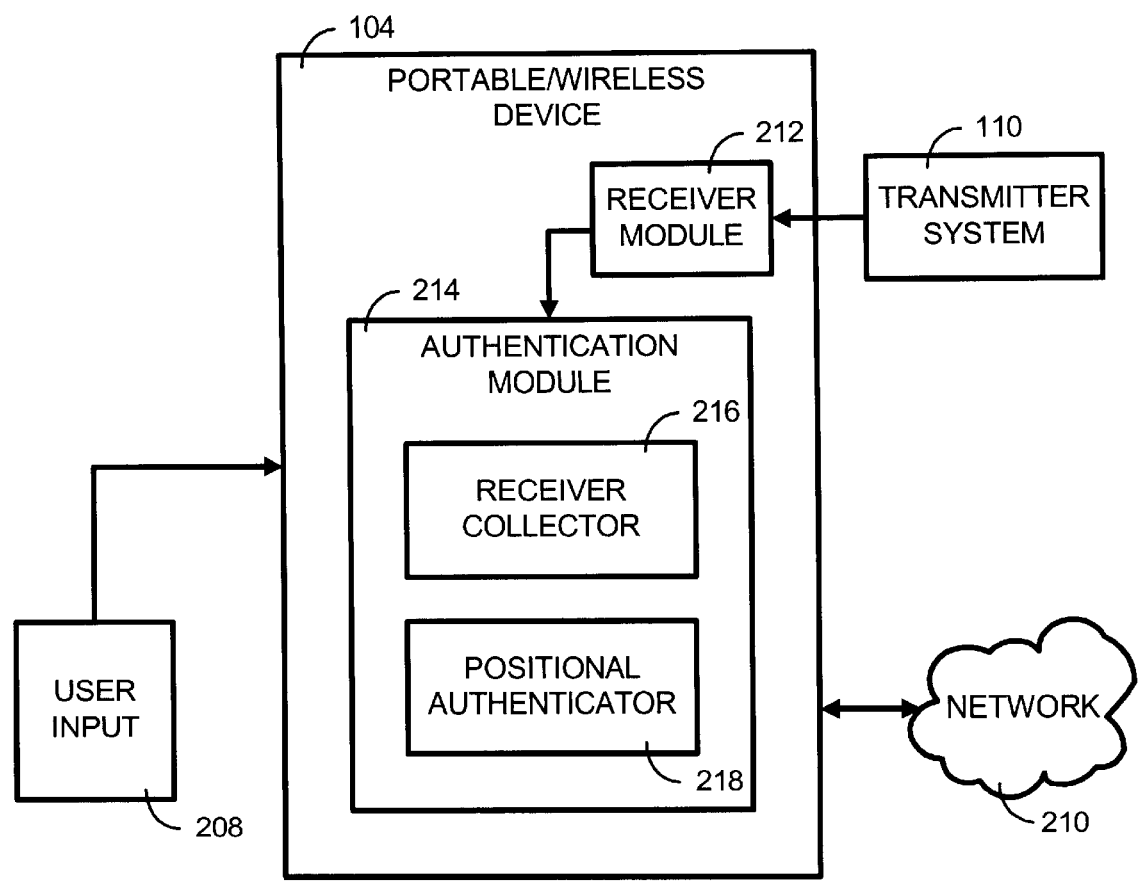
FIG. 2 is a block diagram illustrating the components of the present invention.

FIG. 2 is a block diagram illustrating the components of the present invention. Referring to FIG. 2 along with FIG. 1, the mobile electronic device 104 can be any suitable mobile electronic device, such as a notebook, personal data assistant (PDA), cellular/cordless telephone, or similar smaller device. The mobile device 104 accepts user input 208 from a user 102 and can be interconnected to a network environment 210, preferably wirelessly via a cellular or wireless modem networking system. The network environment 210 can be any suitable network, such as a local or intranet system or a wide area network like the Internet.

The mobile device 104 includes a first receiver module 212 or positional access module that is configured to receive data from the transmitter system 110 for accurately locating the position of the mobile electronic device 104 and define data as positional data. A second module 214 is an authentication module that is configured to access and process the positional data with a receiver collector 216 and a positional authenticator 218 that controls and authenticates access rights to the mobile device 104 based on predefined parameters set by the user 102 or manufacturer or by real-time criteria received from the Internet 210. Therefore, when the electronic device 104 moves from location to location, access to the mobile device 104 can be automatically and dynamically provided or denied, depending on the predefined parameters and the location of the mobile device at the time access is requested. This can automatically prevent unauthorized access of the mobile device 104 based on locations where access is not likely to occur in case of theft or misplacement of the mobile device 104.

II. Details of the Components and Operation

Figure 3:
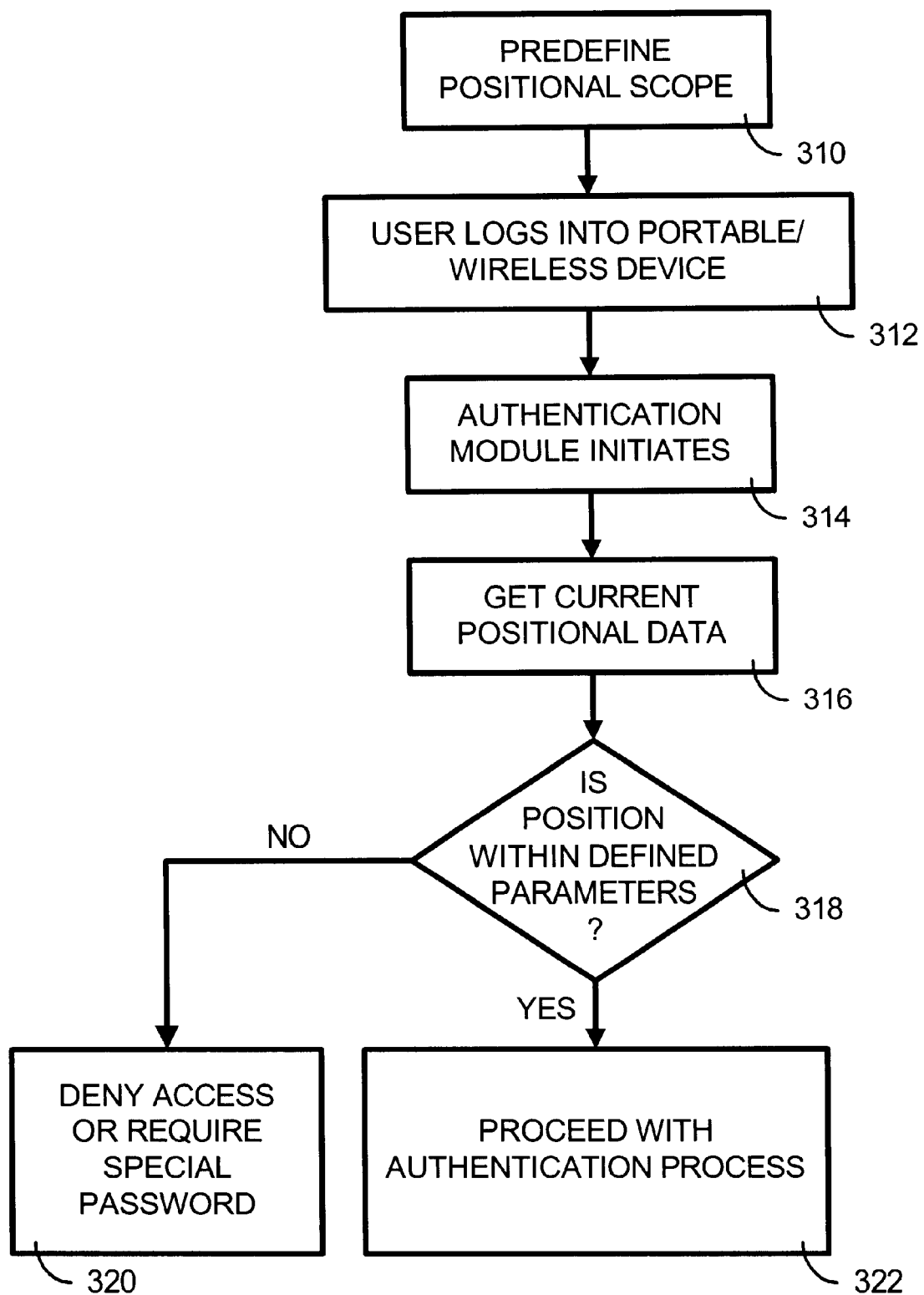
FIG. 3 is a flow chart illustrating operational details of the present invention.

FIG. 3 is a flow chart illustrating operational details of the present invention. Referring to FIGS. 1–2 along with FIG. 3, first, the predefined access parameters or real-time criteria from the Internet 210 is configured (step 310). Basically, the user 102 can define which locations are allowed access or are restricted access areas. For example, if the user knows that he primarily uses his mobile device 104 within a certain area, such as his office or travels only to certain areas or cities, he can predefine those areas as the accessible areas and define all other areas as password protected areas or restricted access areas. If he ever does travel outside of his travel area, he can set the mobile device 104 in "travel mode" which has a period of time that can be defined that he knows he will be traveling. After the time period elapses, the system reverts back to the predefined parameters. This can automatically prevent unauthorized access of the mobile device 104 in case of theft or misplacement of the mobile device.

In addition, the Internet 210 can be used to expand the protection afforded to mobile devices in accordance with the present invention. For example, a private URL can be used to store and update the predefined parameters of the mobile device 104. The Internet 210 can access the stored parameters and send the parameters to the mobile device 104 for real-time updating. Further, in case the mobile device is stolen or misplaced, the Internet 210 can be used to instantly change the access parameters of the mobile device 104, locate the mobile device 104, send messages that appear on the mobile device 104 on how to return it or upload all data residing on the mobile device 104 to prevent theft of sensitive data or to recover data.

Referring back to FIGS. 1–3, second, the user 102 starts-up or logins to the mobile electronic device 104 (step 312). Third, the authentication module 214 initiates (step 314) and the positioning receiver 212 and receives information relative to a position from the wireless positional system 110 (step 316). This allows the mobile electronic device 104 to access positional data, which can be related to the software running on the device 104. The transmitter system 110 is accessed by a receiver of the mobile electronic device 104 and the receiver of the mobile electronic device 104 determines its location based on coordinates received, for example through triangulation, from the transmitter system 110. As such, specific positional location data of the electronic device 104 is determined, namely, latitudinal, longitudinal and elevational coordinates. The specific positional data can also be automatically and dynamically provided to the user 102 of the mobile electronic device 104 for raw positional data use.

Fourth, the authentication module 214 then determines whether the position of the mobile device 104 is within the predefined access parameters (step 318). If the position of the mobile device 104 is not within the predefined access parameters, access is denied or requires a special password (step 320). If the position of the mobile device 104 is within the predefined access parameters, access is granted (step 322). This process can be accomplished since the mobile electronic device is automatically and dynamically tracked by the positioning receiver. Also, the software running on the mobile device can be preprogrammed with parameters that define what locations require a password or create restricted access.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically controlling access to a mobile computing device with pertinent data, comprising:

predefining access parameters of the mobile computing device;

determining an actual location of the mobile computing device;

using the actual location of the mobile computing device to automatically control access to the mobile computing device based on the predefined access parameters;

storing the predefined access parameters in a private Internet networked location;

accessing and updating the predefined access parameters; and sending the updated access parameters to the mobile computing device.

2. The method of claim 1, further comprising controlling access to certain operational interfaces of the mobile computing device based on its actual location.

3. The method of claim 1, wherein the actual location of the mobile computing device is determined by a global positioning satellite system.

4. The method of claim 1, wherein the mobile computing device is one of a portable notebook computer or a wireless telephone.

5. The method of claim 4, further comprising using three dimensional triangulation to provide latitudinal, longitudinal and elevational data to the mobile computing device.

6. The method of claim 1, wherein the mobile computing device is a portable electronic personal data assistant.

7. The method of claim 1, wherein when the mobile computing device moves from position to position, access to the mobile computing device is automatically and dynamically provided or denied, depending on the predefined access parameters and the location of the mobile computing device at the time access is requested.

8. An electronic tracking system for automatically controlling access to a mobile computing device with predefined access parameters, comprising:

a positioning device electronically coupled to the mobile computing device that determines an actual location of the mobile computing device;

a control module coupled to the mobile computing device that uses the location of the mobile computing device to automatically control access to the mobile computing device based on the predefined access parameters; and a storage area located in a private Internet networked location and configured to hold the predefined access parameters and allow access for real-time updating of the predefined access parameters, wherein the undated access parameters are sent to the mobile computing device immediately after the access parameters are updated.

9. The tracking system of claim 8, wherein the control module automatically prevents unauthorized access of the mobile computing device based on locations where access is not likely to occur in case of theft or misplacement of the mobile computing device.

10. The tracking system of claim 8, wherein the control module controls access to certain operational interfaces of the mobile computing device based on its actual location.

11. The tracking system of claim 8, wherein the actual location of the mobile computing device is determined by a global positioning satellite system.

12. The tracking system of claim 8, wherein the positioning device receives data from a transmitter system that uses triangulation to determine the actual location of the mobile computing device.

13. The tracking system of claim 12, wherein the transmitter system uses three dimensional triangulation to provide latitudinal, longitudinal and elevational data to the mobile computing device.

14. The tracking system of claim 8, wherein the mobile computing device is a portable electronic personal data assistant.

15. The tracking system of claim 8, wherein when the mobile computing device moves from position to position, access to the mobile computing device is automatically and dynamically provided or denied, depending on the predefined access parameters and the location of the mobile computing device at the time access is requested.

16. An electronic tracking system for automatically providing access to a portable notebook computer based on predefined access parameters and a location of the portable notebook computer, comprising:

a receiver positional access module configured to receive data from a global positioning satellite system to accurately locate and define data as positional data of the portable notebook computer;

an authentication module configured to access and process the positional data with a receiver collector and a positional authenticator that controls and authenticates access rights to the mobile device based on predefined access parameters manually set by a user of the portable notebook computer; and a storage area located in a private Internet networked location and configured to hold the predefined access parameters and allow access for real-time updating of the predefined access parameters by the user, wherein the updated access parameters are sent to the portable notebook computer immediately after the access parameters are updated by the user.

17. The electronic tracking system of claim 16, wherein the authentication module controls access to certain operational interfaces of the portable notebook computer based on its actual location.

18. The electronic tracking system of claim 16, wherein the actual location of the portable notebook computer is determined by a global positioning satellite system that uses three dimensional triangulation to provide latitudinal, longitudinal and elevational data to the receiver positional access module.

19. The electronic tracking system of claim 6, wherein access to the portable notebook computer is automatically controlled as the portable notebook computer moves from one location to another, depending on the predefined access parameters and the location of the portable notebook computer at the time access is requested.

20. The electronic tracking system of claim 16, wherein the authentication module automatically prevents unauthorized access of the portable notebook computer based on locations where access is not likely to occur.

* * * * *